April 16, 1929.  J. H. DE BOER ET AL  1,709,781
PROCESS FOR PRECIPITATING HAFNIUM AND ZIRCONIUM ON AN INCANDESCENT BODY
Filed Oct. 6, 1925
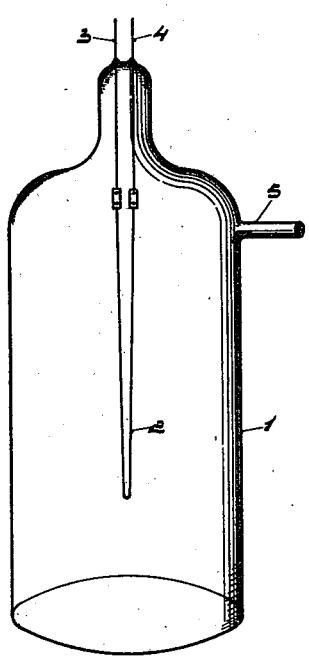

Patented Apr. 16, 1929.

1,709,781

UNITED STATES PATENT OFFICE.

JAN HENDRIK DE BOER AND ANTON EDUARD VAN ARKEL, OF EINDHOVEN, NETHERLANDS, ASSIGNORS TO N. V. PHILIPS' GLOEILAMPENFABRIEKEN, OF EINDHOVEN, NETHERLANDS.

PROCESS FOR PRECIPITATING HAFNIUM AND ZIRCONIUM ON AN INCANDESCENT BODY.

Application filed October 6, 1925, Serial No. 60,776, and in the Netherlands July 25, 1925.

This invention relates to a process for precipitating hafnium and zirconium on an incandescent body.

According to the invention the process for precipitating hafnium or zirconium or both of them on an incandescent body consists in heating the latter in an atmosphere containing one or more iodides of the metals to be precipitated and being free from impurities to such an extent that the metals precipitated are ductile.

It has been found already that hafnium and zirconium can be precipitated on an incandescent body by heating the latter in an atmosphere containing one or more iodides of the metals to be precipitated. It has been found however, that the hafnium and zirconium obtained in this manner may be said to be, it is true, practically pure, that, however, the metal thus obtained is not ductile. Only if the iodides of hafnium or zirconium or again the substances from which these iodides are formed are used in a state of utmost purity, the hafnium or zirconium is obtained in a ductile state. Even a minute quantity of impurities of the said iodides can prevent the formation of ductile hafnium or zirconium; even impurities which analytically can no longer be demonstrated, may give unfavourable results in this respect.

It is not impossible that this circumstance can be explained by the following considerations. If a body acting as a core, is heated in an atmosphere containing, in addition to hafnium iodide or zirconium iodide, a small quantity of impurities as nitrogen, carbon compounds etc., not any hafnium metal or zirconium metal but compounds of hafnium, or zirconium as nitride, carbide, etc., are precipitated on the core body. If, on the contrary, the said impurities are present only in a minute quantity, hafnium or zirconium will be precipitated, it is true, but yet the impurities present will give rise to the formation of minute quantities of compounds of hafnium or zirconium, which compounds will deposit among the metallic hafnium or zirconium. However small the quantity of these hafnium or zirconium compounds may be, even if it were impossible to prove their presence by analysis, yet the influence they exert on the properties of the metal precipitated may be such that the latter is not ductile.

It is evident that gaseous impurities or admixtures which are chemically indifferent with respect to the metal to be precipitated, do not exert any influence on the properties of this metal.

The core body is, preferably, heated to such a temperature that the metal precipitated grows in a direction at right angles to the surface of the body so as to form a single-crystal. In the case of hafnium this growth only takes place above about 1750° C., in the case of zirconium above about 1600° C. in contradistinction to the multicrystalline growth which both for hafnium and for zirconium begins already at 1400° C.

According to the invention, very good results are obtained if first a core body is heated in an atmosphere containing one or more iodides of the metals to be precipitated, whereupon a second core body is heated in a vessel containing the metal precipitated and pure iodine, in which case hafnium or zirconium or both of them are precipitated in a ductile form.

The invention will be more clearly understood by referring to an example. The figure represents in perspective view an apparatus adapted to carry out the process.

The apparatus consists of a vessel 1 in which is arranged a wire 2 which acts as a core body. This wire which only has a very small diameter, is made for example of tungsten, and is electrically connected e. g. by means of little screws to leading-in wires 3 and 4, which are hermetically sealed into the upper end of the vessel so that by means of an electric current the tungsten wire can be brought up to the suitable temperature. The vessel is provided with a side-tube 5 which can be connected to a pump and through which the gases present in the vessel 1 can be removed therefrom. If now hafnium iodide or metallic hafnium, and iodine, which last-named substances at a higher temperature also form hafnium iodide, is introduced into the vessel 1, and if the vessel is heated to a temperature such that the hafnium iodide has a sufficient vapour pressure, the hafnium iodide vapour will be decomposed by heating the tungsten wire to incandescence and metallic hafnium will deposit on the wire. For this purpose the tungsten wire has to be heated to a temperature of about 1450° C. Although the hafnium thus formed may be very pure, even to such an extent that the presence of impurities can no longer be shown by analysis, it turned out that at the ordinary temperature the hafnium metal did not possess the property of ductility. The term ductility is to be understood to mean here the property of the metal of being drawn to have the shape of a wire or of being rolled into a band.

In order to obtain hafnium in a ductile state, the metal precipitated together with very pure iodine is introduced into an apparatus quite similar to that represented in the figure. A tungsten wire of very small diameter can be used again as a core body, said wire being heated to a temperature, lying preferably, above 1750° C. If now the vessel is heated to a temperature lying between 400 and 600° C., hafnium iodide will be formed and hafnium will be precipitated on the tungsten core wire. It has been found that even at the ordinary temperature hafnium thus prepared can be drawn by means of a drawing die to a smaller diameter, the hafnium being consequently ductile at the ordinary temperature. By repeatedly submitting the same hafnium wire to the growing and drawing process, the percentage of tungsten initially occurring in the hafnium owing to the presence of the tungsten core wire, can be made as small as desired.

For preparing ductile zirconium, the same process as that above described for hafnium, may be carried into effect, which process only differs therefrom in that the first core wire is heated to about 1450° C. and that the second core wire, is preferably, heated to a temperature above 1600° C. The maximum temperature to which the core wire is allowed to be heated, is determined either by the melting temperature of the core wire if the latter consists of the same metal as the metal to be precipitated, or by the melting temperature of the eutectic of the core wire metal and the metal to be precipitated if the core wire consists of another metal than the metal to be precipitated.

Ductile hafnium or zirconium can also be produced by starting from metallic hafnium and zirconium which is refined in another manner than that above described. For example, the hafnium or the zirconium can be annealed in a vacuum.

It is obvious that care should be taken that the vessel in which the ductile metal is to be prepared and the metal particles present in said vessel, are also free from gaseous impurities or at least do not evolve them during the preparation of the ductile metal.

What we claim is:

1. In the process of precipitating at least one of the metals hafnium and zirconium on an incandescent body heated in an atmosphere containing at least one of the iodides of the said metals, the use of an atmosphere being at the same time substantially free from impurities so that the metals are precipitated in a ductile form.

2. In the process of precipitating at least one of the metals hafnium and zirconium on an incandescent body heated in an atmosphere containing at least one of the iodides of the said metals, the use of iodides prepared by starting from at least one of the metals hafnium and zirconium which have been annealed in a vacuum.

3. In carrying out the process of precipitating at least one of the metals hafnium and zirconium on an incandescent body heated in an atmosphere containing at least one of the iodides of the said metals, the method of heating the said body to a temperature over 1600° C. in an atmosphere which is substantially free from impurities so that the metal precipitated grows in a direction at right angles to the surface of the body so as to form a single crystal.

4. In the process of precipitating at least one of the metals hafnium and zirconium on an incandescent body heated in an atmosphere containing at least one of the iodides of the said metals, using as starting materials for the production of the said atmosphere pure iodine and at least one of the metals hafnium and zirconium prepared by precipitation on another incandescent body from an atmosphere containing at least one of the iodides of the said metals.

5. In carrying out the process for precipitating at least one of the metals hafnium and zirconium on an incandescent body heated in an atmosphere containing at least one of the iodides of the said metals, the method of heating the said body to a temperature over 1600° C. in an atmosphere containing iodides which are formed by heating together pure iodine and at least one of the metals hafnium and zirconium prepared by precipitation from an atmosphere containing at least one of the iodides of the said metals on another incandescent body.

In testimony whereof we affix our signatures, at the city of Eindhoven, this 16th day of September A. D. 1925.

JAN HENDRIK DE BOER.
ANTON EDUARD VAN ARKEL.